(12) United States Patent
Bowen

(10) Patent No.: US 8,946,535 B2
(45) Date of Patent: Feb. 3, 2015

(54) SPLIT KEYBOARD FOR PC DATA AND MUSIC OUTPUT

(71) Applicant: James H. Bowen, Elizabeth City, NC (US)

(72) Inventor: James H. Bowen, Elizabeth City, NC (US)

( * ) Notice: Subject to any disclaimer, the term of this patent is extended or adjusted under 35 U.S.C. 154(b) by 195 days.

(21) Appl. No.: 13/713,683

(22) Filed: Dec. 13, 2012

(65) Prior Publication Data
US 2013/0098226 A1 Apr. 25, 2013

Related U.S. Application Data

(62) Division of application No. 12/940,689, filed on Nov. 5, 2010, now Pat. No. 8,354,580.

(51) Int. Cl.
G10H 1/32 (2006.01)
G10H 1/34 (2006.01)
G06F 3/02 (2006.01)

(52) U.S. Cl.
CPC ............... *G10H 1/34* (2013.01); *G06F 3/0202* (2013.01); *G06F 3/021* (2013.01); *G06F 3/0213* (2013.01); *G06F 3/0219* (2013.01); *G06F 3/0221* (2013.01); *G10H 1/344* (2013.01); *G10H 2220/231* (2013.01)
USPC ................... 84/719; 84/718; 84/720; 84/743; 84/744; 84/745

(58) Field of Classification Search
CPC ....... G06F 1/1632; G06F 8/61; G06F 1/1601; G06F 1/1624; G06F 1/1662; G06F 1/1664; G06F 3/03548; G10H 1/32; G10H 2220/221; G10H 1/186; G09G 2310/0281; G10G 3/04; G10C 3/12; G10C 3/00; G10C 3/02; G10C 5/005; G10C 1/00; G10C 9/00
See application file for complete search history.

(56) References Cited

U.S. PATENT DOCUMENTS

| | | | |
|---|---|---|---|
| 5,088,378 A | 2/1992 | DeLaTorre | |
| 5,463,925 A | 11/1995 | Galocy | |
| 5,502,460 A | 3/1996 | Bowen | |
| 5,644,338 A | 7/1997 | Bowen | |
| 5,971,635 A | 10/1999 | Wise | |
| 6,063,994 A | 5/2000 | Kew et al. | |
| 6,268,557 B1 | 7/2001 | Devecka | |
| 6,351,225 B1 | 2/2002 | Moreno | |
| 6,420,641 B1 | 7/2002 | Kuan | |
| 6,444,888 B1 | 9/2002 | VanDruff | |
| 6,842,168 B1 | 1/2005 | Sim et al. | |
| 7,105,738 B2 | 9/2006 | Sim et al. | |
| 7,215,328 B2 | 5/2007 | Sim et al. | |
| 7,465,868 B2 * | 12/2008 | Lengeling ...................... 84/719 |
| 7,928,312 B2 * | 4/2011 | Sharma .......................... 84/719 |
| 8,354,580 B2 * | 1/2013 | Bowen ........................... 84/719 |
| 2004/0231500 A1 | 11/2004 | Sim et al. | |
| 2004/0231501 A1 | 11/2004 | Sim et al. | |
| 2005/0056144 A1 | 3/2005 | Yang et al. | |
| 2005/0087061 A1 | 4/2005 | Sim et al. | |

(Continued)

*Primary Examiner* — Marlon Fletcher
(74) *Attorney, Agent, or Firm* — Whitham Curtis Christofferson & Cook, PC

(57) ABSTRACT

A split keyboard with an optional middle section of keys for controlling regular PC input to a host, to play music, and to input and play music with a multiple octave keyboard that when the middle section of keys are removed can be portable to travel. And when working on just the split keyboard inputting data to a host the operator arms are not abducted due to the perpendicular advantage or slide apart keyboard where an operators arms are perpendicular to the keyboard keys.

10 Claims, 17 Drawing Sheets

(56) References Cited

U.S. PATENT DOCUMENTS

| | | |
|---|---|---|
| 2007/0240560 A1 | 10/2007 | Plamondon |
| 2009/0049980 A1* | 2/2009 | Sharma .......................... 84/719 |
| 2009/0064850 A1 | 3/2009 | Lengeling |
| 2009/0114078 A1 | 5/2009 | Plamondon |
| 2011/0252949 A1 | 10/2011 | Lengeling |
| 2012/0090446 A1 | 4/2012 | Moreno |
| 2012/0111173 A1* | 5/2012 | Bowen ............................ 84/170 |
| 2012/0180622 A1* | 7/2012 | Sharma ........................... 84/744 |
| 2013/0002524 A1* | 1/2013 | Sirpal et al. .................... 345/1.3 |

* cited by examiner

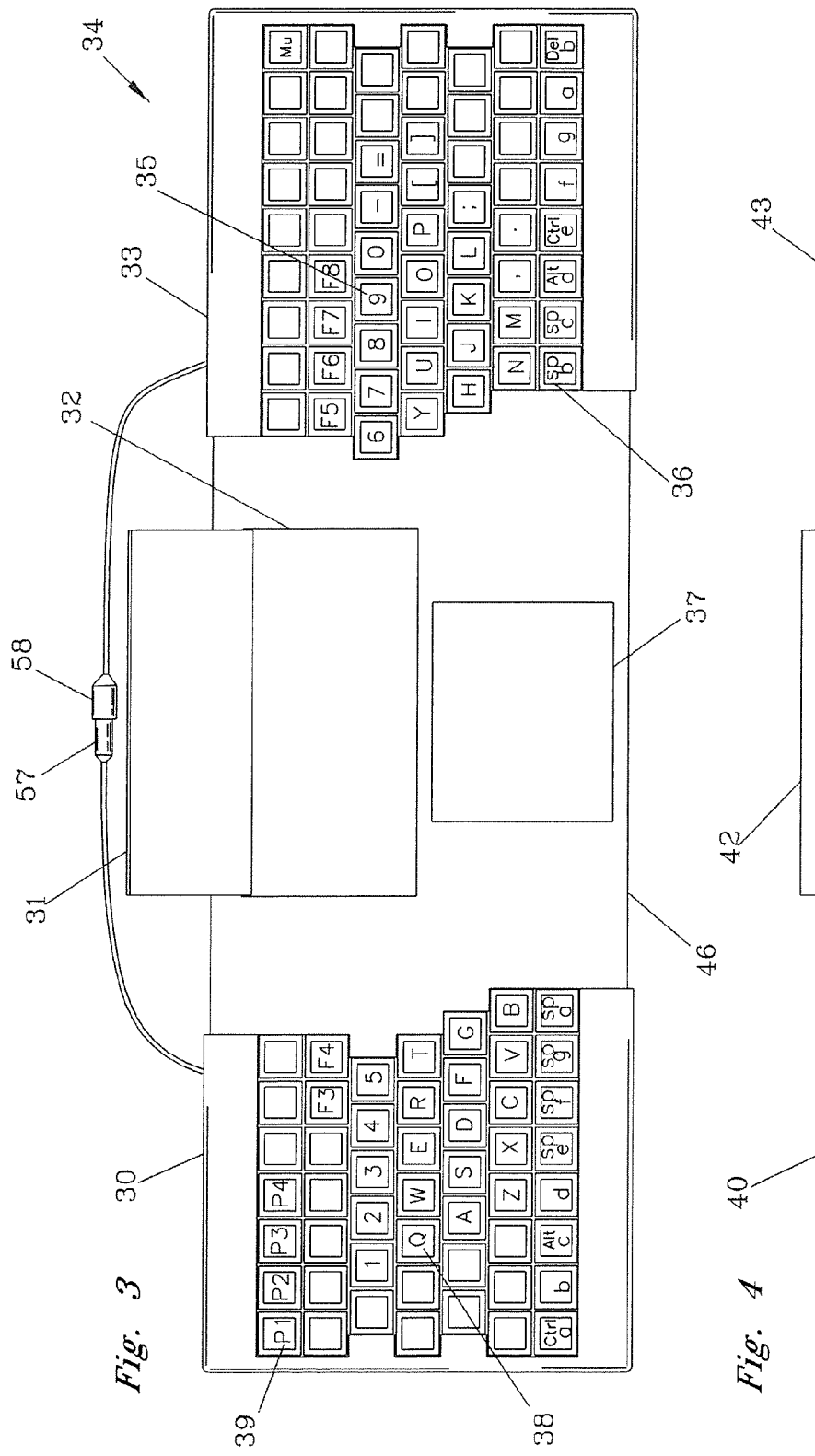

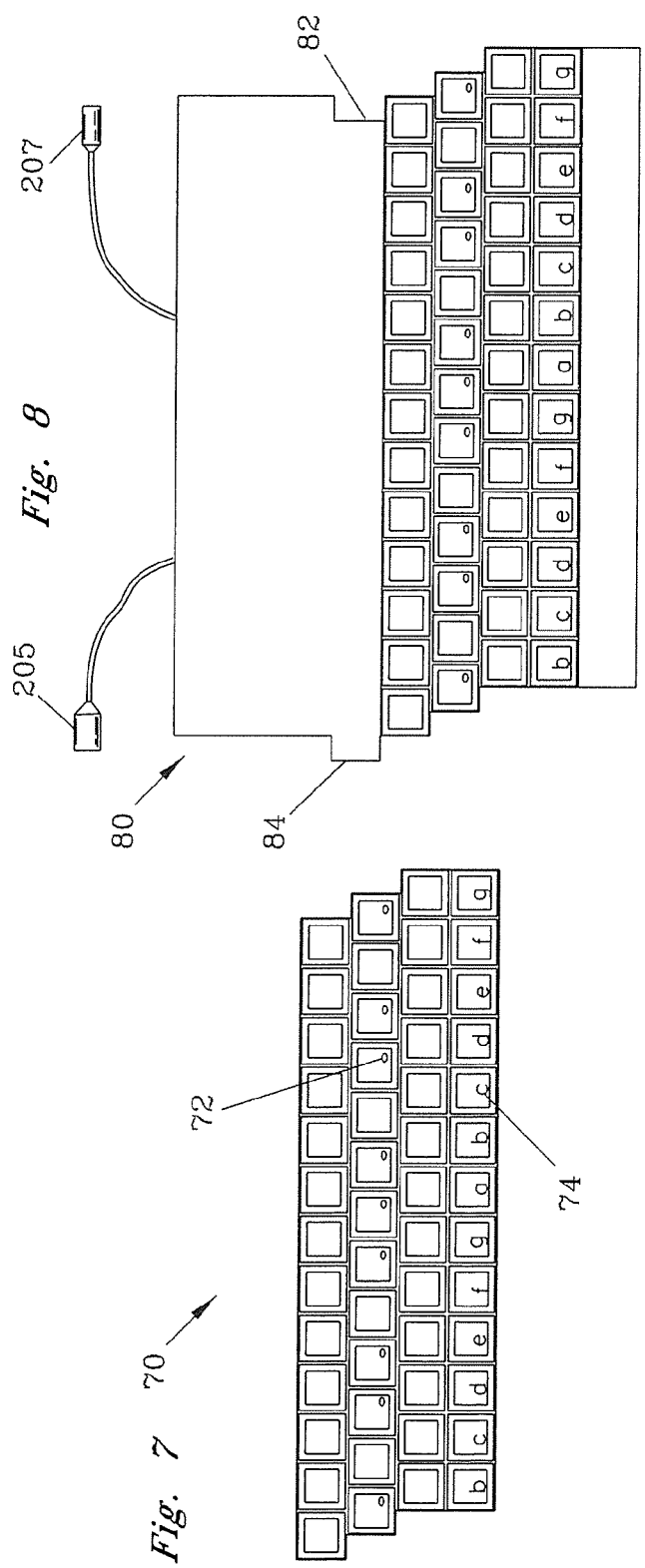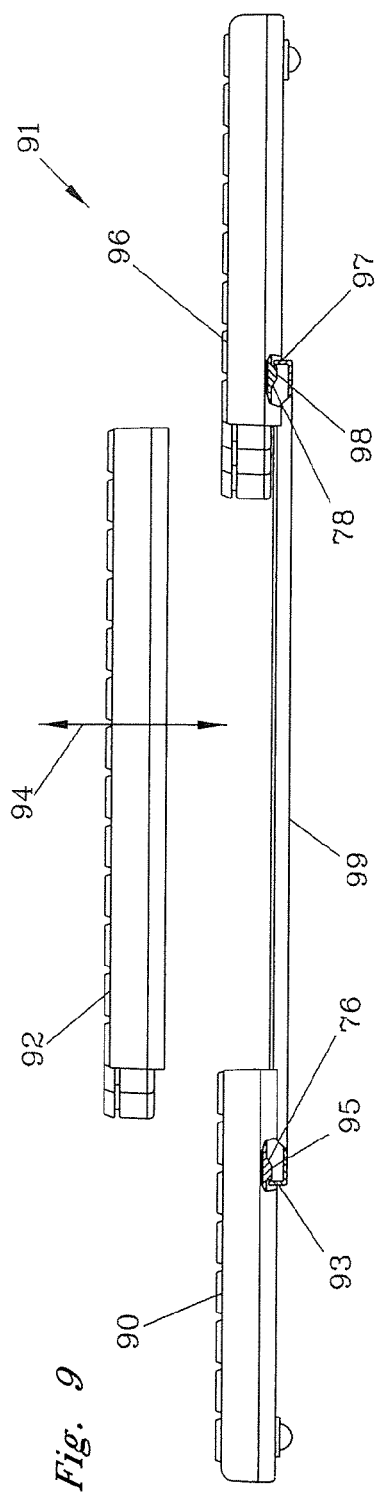

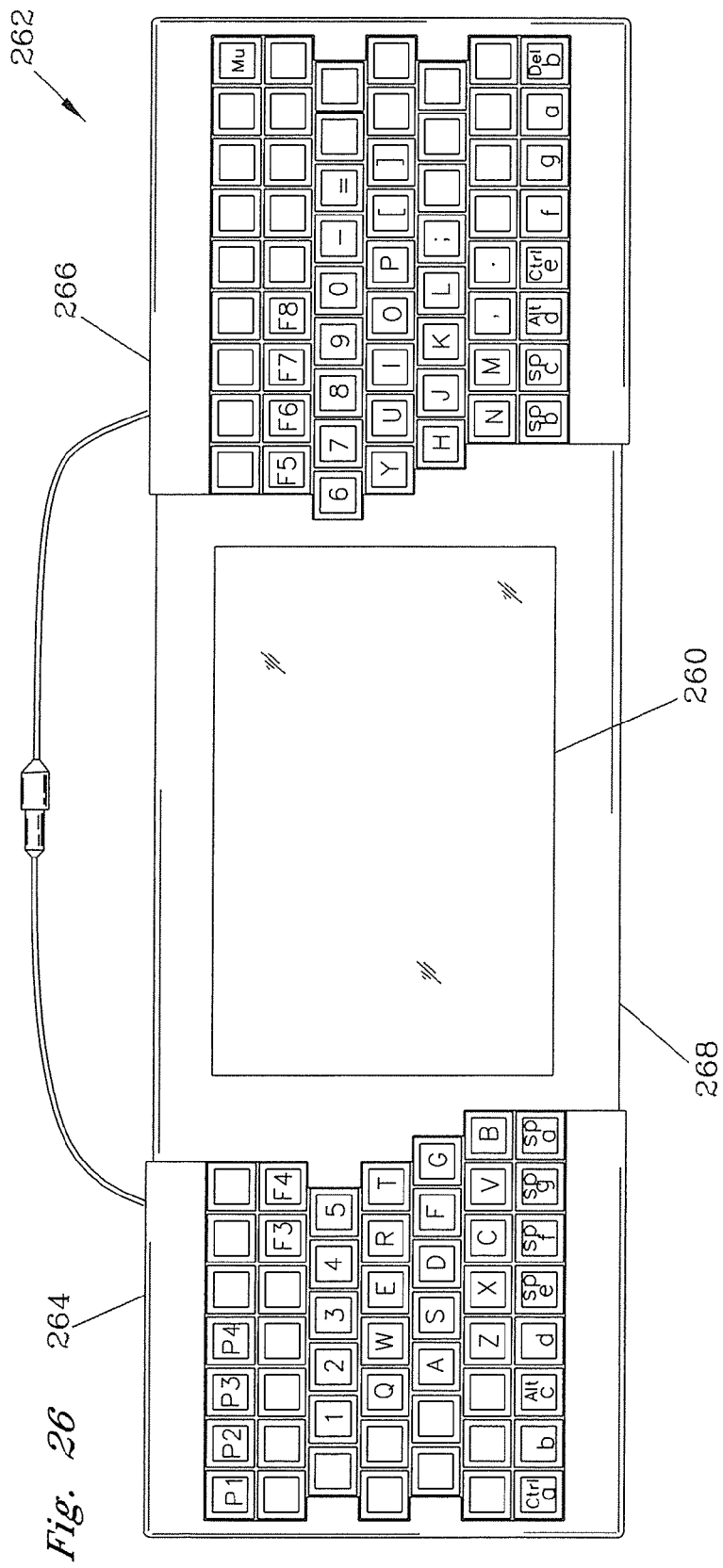

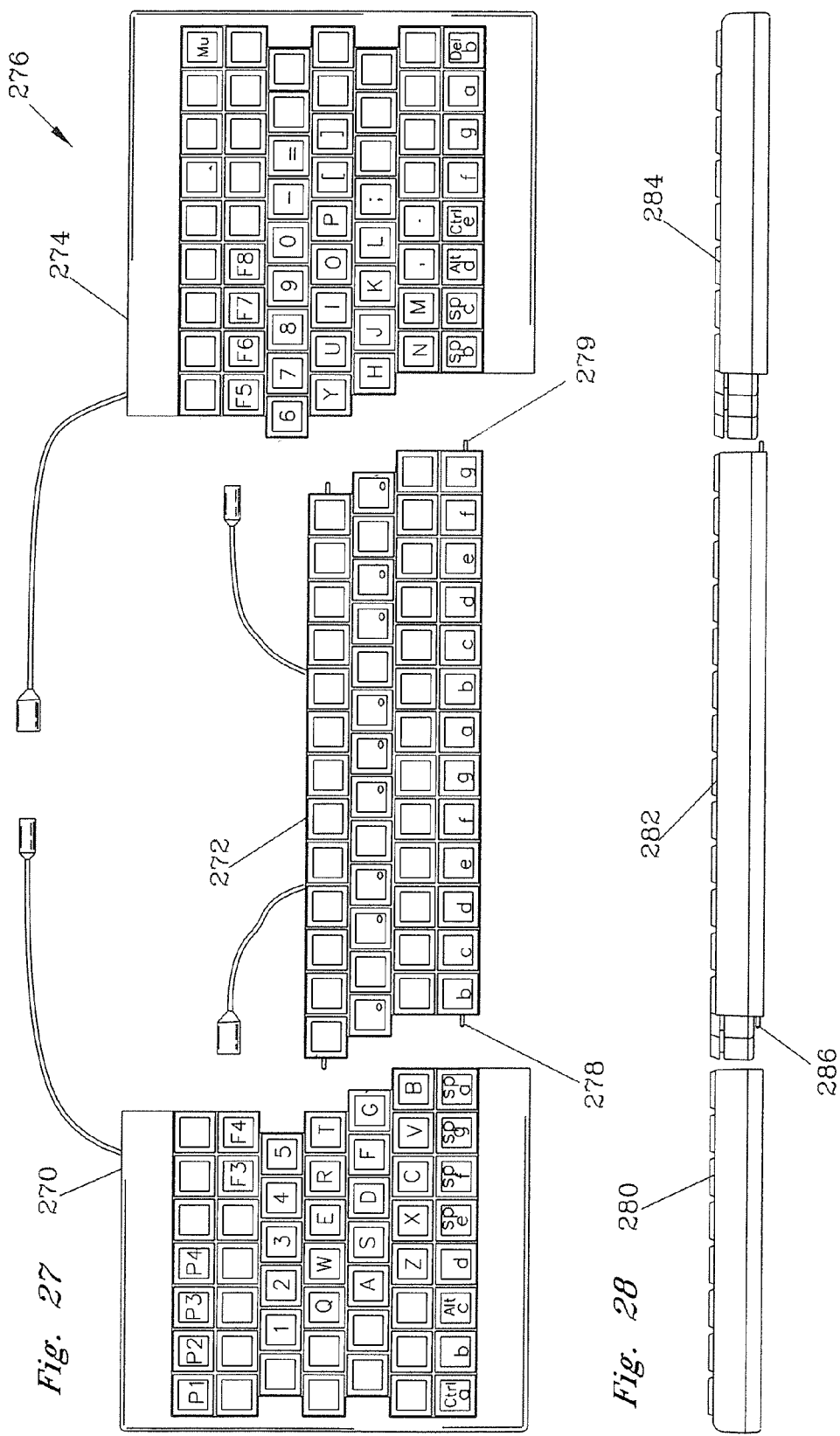

SPLIT KEYBOARD FOR PC DATA AND MUSIC OUTPUT

CROSS-REFERENCE TO RELATED APPLICATIONS

This application is a divisional application of U.S. patent application Ser. No. 12/940,689 filed Nov. 5, 2010, now U.S. Pat. No. 8,354,580.

BACKGROUND OF THE INVENTION

1. Field of the Invention

The present invention generally relates to keyboards used for data and music data output for PC and standalone music for office and traveling.

2. Description of the Prior Art

Split keyboards are on the market from Micro Soft Corporation and Apple Corporation where the keyboard pattern is split and rotated resulting in the users arms being abducted.

Bowen U.S. Pat. Nos. 5,502,460 and 5,644,338 shows a split keyboard for input to a PC.

Fort U.S. Pat. No. 5,228,791 shows a split keyboard for input tp a PC.

Margolin U.S. Pat. No. 3,940,758 shows a foldable calculator keyboard with a center section of keys.

There are many companies that make musical keyboards from eighty-eight keys down.

SUMMARY OF THE INVENTION

It is therefore one primary objective of this invention is for a split PC keyboard for PC data input where the split PC keyboard opens and allows for a middle section of keys. With the number of middle section keys plus the PC keyboard left and right sections of keys the total number of keys can give multiple octaves of individual keys with substantially the same size and pitch. This allows a user of a more standard type of musical keyboard to more easily transition between the more standard musical keyboard and this more portable keyboard that is separable. It is also very important for all of the standard PC keyboard functions be maintained within the split keyboard so an employee can still do their job, making the split keyboard not additive to the standard PC keyboard but is used in place of the standard PC keyboard.

It is a further objective of this invention for the middle section of keys to be removable from between the left and right sides of keys to allow the left and right sides of keys to close together and still be used as a standard PC keyboard.

It is a further objective of this invention to be portable and give enough keys to be useful in an office environment to convert a users PC keyboard to music input and relax or while traveling in a hotel room composing music via programs like Music Studio by Sony with a keyboard small enough to fit in normal carry on luggage.

It is a further objective of this invention to reduce the amount of arm and elbow lift away from the body, in human kinetics it is called abduction when the split keyboard is being used in the split position for PC input do to the perpendicular advantage or slide apart keyboard where an operators arms are perpendicular to the keyboard and not abducted.

It is a further objective of this invention to have music control keys for selecting different instruments of sound output types, volume, and programmable keys.

It is a further objective of this invention to be the keyboard within a portable computer that splits to accept the middle section of keys.

BRIEF DESCRIPTION OF THE DRAWINGS

The foregoing and other objects, aspects and advantages will be better understood from the following detailed description of the invention with reference to the drawings, in which:

FIG. 3 is a plan view of the split keyboard with the middle section of key removed in accordance with the teachings of this invention;

FIG. 4 is a front view of FIG. 3 with the middle section of keys removed in accordance with the teachings of this invention;

FIG. 7 is a plan view of a middle section of keys that inserts between the left and right sides of the split keyboard in accordance with the teachings of this invention;

FIG. 8 is a plan view of a more conformal middle section of keys that inserts and covers from front to rear the space between the left and right side of the split keyboard in accordance with the teachings of this invention;

FIG. 9 is a view of FIG. 4 showing the direction of inserting the middle section of keys in accordance with the teachings of this invention;

FIG. 26 shows a plan view of the split keyboard with a display between the keyboard sides in accordance with the teachings of this invention;

FIG. 27 shows a plan view of the split keyboard with free standing keyboard sides with a middle section of keys with alignment pins between the keyboard sides in accordance with the teachings of this invention;

FIG. 28 shows a front view of FIG. 27 with free standing keyboard sides with a middle section of keys with alignment pins between the keyboard sides in accordance with the teachings of this invention;

DETAILED DESCRIPTION OF THE INVENTION

Figures 1, 2:
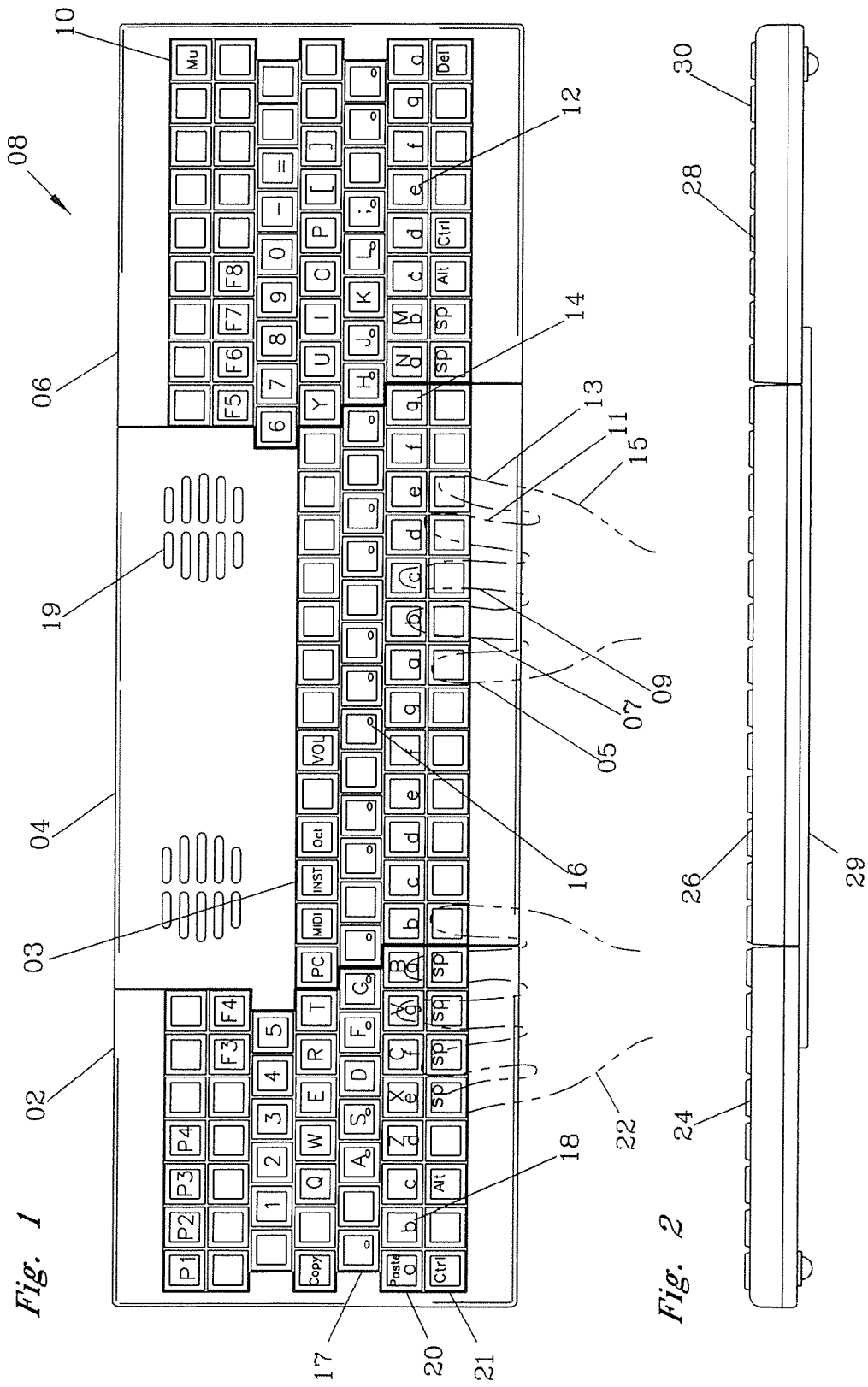
FIG. 1 is a plan view of a split keyboard with a removable middle section of keys in accordance with the teachings of this invention.
FIG. 2 is a front view of FIG. 1 showing all keys of the left and right hand, and middle section of keys are planar in accordance with the teachings of this invention.

Referring now to the drawings, FIG. 1 shows keyboard 08 with the left side keyboard 02 and the right side keyboard 06 separated and receiving middle section keyboard 04 in a music playing configuration. While it is very suitable to ten finger type on a PC keyboard or also know as touch typing, it should also be appreciated that the keyboard must also be suitable for ten finger cords. The size and location of middle keyboard section 04 must be of a size to maintain the lateral pitch in both the vertical and horizontal directions of the three keyboard sections, whereas if left keyboard section 02 and right keyboard section 06 where spaced wider than necessary middle keyboard section 04 would have a space at the ends of middle keyboard section 04 thus making the play of music more prone to mistakes and failure to musicians. Thus it is pertinent for the play of music to have a contiguous key to key lateral pitch, although where a cord starts is a function of preference of the user and application in as much as the first key in an octave on the keyboard may start with the A note, or it could start with the C note, but once started the contiguous octave must continue. The middle section of keys is to add additional keys for controlling function of the keyboard 08, controlling host PC function and the play of music. The key to key pitch over the separation edges of the keyboards is very important for maintaining ease of play or typing. The distance from the key centerline to a mating edge dimensionally is less than half the pitch of the key measured from the centerline of the key to outer edge of the keyboard housing at the mating edge whether it is between the left side keyboard and the middle section, or between the right side keyboard and the middle section.

The contiguous plurality of shown keys with continuous repeating octaves allows music to be played in a more normal feel to a musician in order to play music as on a piano making the transition easier. As shown there are four cords of keys, but depending on different applications there could be more or less octaves of keys thus varying the length of the keyboard. Mu key 10 can be used to select between PC output and music output, but those skilled in the art can realize that this could also be selected by a mouse. Left music key 18, middle music key 14 and right music key 12 show the music octaves that could be printed on the key for a learning keyboard or as with other keyboards not printed because the user knows what keys are in an octave and where and how the keys are placed within a keyboard. A symbol is placed on sharp key 16 in sharp row 17 and is repeated in the position where sharp keys are appropriately placed in relation to the keys. Music control row 03 with keys like an octave key so as a musician needs more octaves can select higher or lower octaves effectively making the keyboard more than a four octave as shown, or output keys like which instrument sound the keyboard will produce. Music note row 20 is the contiguous row of keys at substantially the same lateral pitch but depending on the application the contiguous lateral key pitch could be in row 21 nearest to the operator also. Keys can output the velocity codes showing how hard the key was struck and output those to a host, then if held down longer and more finger pressure is applied will output codes representative of keyboard key after pressure. And if while holding down the key and moving the key laterally with output codes representative of vibrato to the host computer. All three of these functions velocity, after pressure and vibrato are incorporated in each single position key without any other control keys necessary. When keyboard 08 is in PC keyboard mode biasing the key to the left, right, up or down can move the cursor like the arrow keys for quickly going back and correcting a mistake or other necessary functions of the arrow keys, but those skilled in the art can appreciate there are many other uses for side wards or lateral functions of the keys. Speaker 19 is for outputting the musical sound generated by one or more of keyboard 08 sections when in music mode. The musical programs on the market the PC would normally be used for music sounds and functions.

When playing music fingers are not all the same length so music keys in key row 20 and key row 21 nearest the operator can output the same key note allowing right hand 15, shown in phantom, with little finger 13 and thumb 05 to contact keys in the first row and middle finger 09 contact the keys in the second row leaving ring finger 11 and index finger 07 to touch the keys in the top of the first row and the bottom of the second row limiting the amount of unnatural arch needed in fingers therefore making the feel more like a normal music keyboard with long keys. FIG. 1 also showing left hand 22 in phantom spanning left side keyboard 02 and middle section keyboard 04 allowing contiguous play of the octaves on the keyboard.

Keyboard left side 02 and keyboard right side 06 can be used by an operator in any position for PC input from being closed to an open position depending on the amount of separation that best ergonomically reduces physical stress in the operator arms, shoulders and body as human kinetics dictates, as in one case arm abduction keeping the elbow close to an operator side giving the split keyboard the perpendicular advantage where the arm is better positioned when perpendicular to the keyboard and the elbow is not abducted.

FIG. 2 shows left side keyboard 24, middle section keyboard 26 and right side keyboard 28 being held in the same plane by lower housing 29 when middle keyboard section 26 is inserted. Key 30 can be flat as shown or dished or even contoured while still being coplanar with the other keys.

Figures 20, 21:
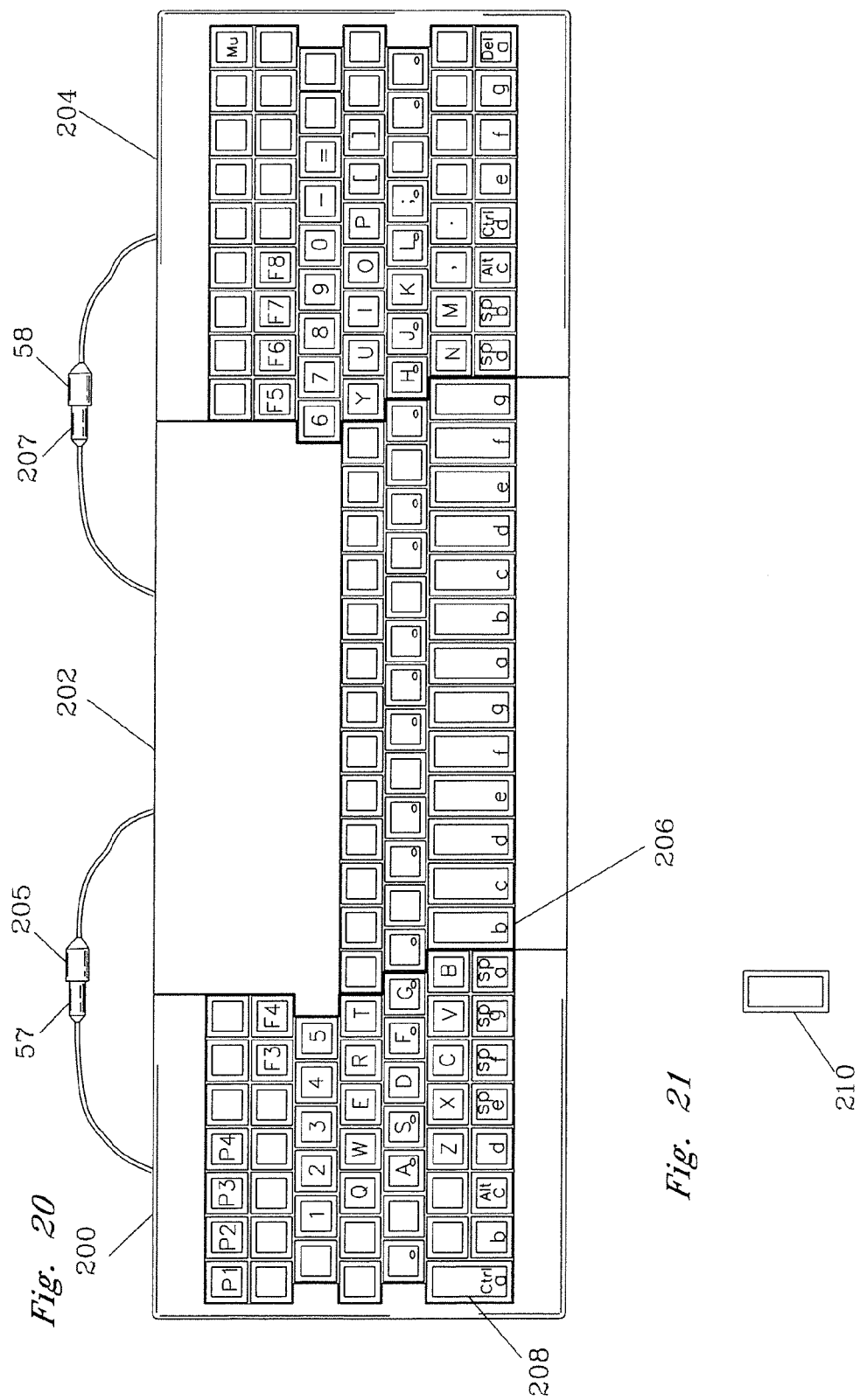
FIG. 20 is a plan view of a split keyboard showing a key spanning two positions to better feel like a regular piano keyboard to a user in accordance with the teachings of this invention.
FIG. 21 shows a key that spans more than one position in accordance with the teachings of this invention.

FIG. 3 shows keyboard 34 with left side keyboard 30 separated from right side keyboard 33 in an open position aligned by lower housing 46 in a PC input configuration. Document holder 31 can be opened to position a document for reference typing and when not in use folded away in document holder recess 32 when not in use or when keyboard 34 is in a closed position. Number key 35 and QWERTY keys 38 show keys associated with ten finger or touch PC keyboard typing. Programmable keys 39 can be programmed by keyboard 34 or the host with a specific sequence to further enhance function of keyboard 34 for a user. Space key 36 is shown singular but with multiple space keys as shown any of which can be touched to get a space key input, but when the note key row 20 of FIG. 1 are only in row 20 then space key 36 can be wider more like a normal split PC keyboard. Space key 36 is also double marked to show its position in an octave scale for playing music with only two octaves shown, but the marking could be left off because only a beginner would need to know where a key is in octave position. In PC keyboard input mode with the keyboards halves separated abduction is lessened. Touch pad 37 can be placed on keyboard 34 when an external mouse is not available by user preference. Cable with female connection 58 is shown connected to cable with male connection 57 to connect left hand side keyboard 30 and right hand side keyboard 33 for inner keyboard 34 communications, those skilled in the art can appreciate that the cabling could be within the keyboard. But it is advantageous to have external connections when the middle section of keys 202 of FIG. 20 are installed or removed by an operator with no tools or guide book, and are also advantageous for ease of shielding the interconnection wires.

FIG. 4 is a front view of keyboard 34 in FIG. 3 showing left side keyboard 40 and right side keyboard 43 with document holder 42 located in lower housing 46 in an open position and the keys being coplanar to each keyboard side.

This invention is to be used in an office environment inputting PC data and the person takes a break and wants to relax the person inserts the middle section of keys and can play music and be discrete using ear phones. When the person is traveling and wants a portable compact keyboard to input PC data or play and compose music on without bringing along a full size musical keyboard having two keyboards in one is a very advantageous feature.

Figures 5, 5A, 5B:
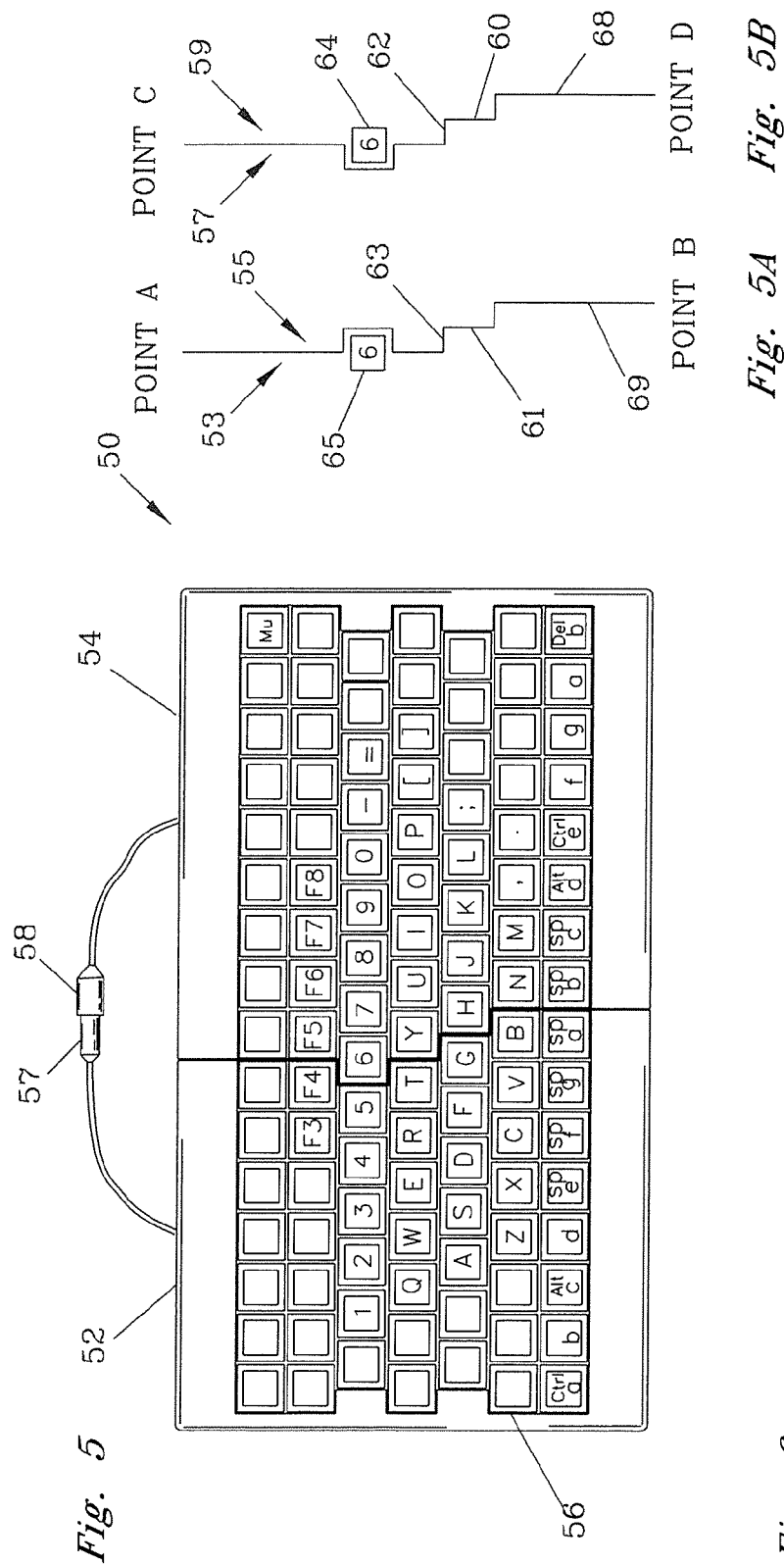
FIG. 5 is a plan view of the split keyboard with the middle section of keys removed and the left and right side of the split keyboard closed together for ten finger typing in accordance with the teachings of this invention.
FIG. 5A shows the irregular split of where keys can be separated between the left and right side of the keyboard in accordance with the teachings of this invention.
FIG. 5B shows a variation of the irregular split of where keys can be separated between the left and right side of the keyboard in accordance with the teachings of this invention.

FIG. 5 shows keyboard 50 in a closed position with left side keyboard 52 and right side keyboard 54 closed together for use in a small area location or to be packed in luggage, and can be still used for playing music with the keys in row 56 with the same lateral key to key pitch and contiguous octave of the keys nearest to the separation point. Depending on the number of keys in row 56 the key associated with the octave may have to be remapped when keyboard 50 is closed or separated to maintain the contiguous octave note position. Cable with female connection 58 is shown connected to cable with male connection 57 to connect left hand side keyboard 52 and right hand side keyboard 54 for inner keyboard 50 communications.

FIG. 5A shows the irregular split or stagger line 69 from "Point A" to "Point B" resultant of qwerty keyboard design at the mating edges of the left side 53 and right side 55 of the split keyboard with key six 65 on left side 53. The vertical lateral pitch 61 and the horizontal lateral pitch 63 can be of any dimension for different applications, some keyboards have a 0.687 inch (17.5 mm) lateral pitch, some have a 0.750 inch (19 mm) lateral pitch but smaller and larger are used in keyboards. Some stagger between keys of different lines or rows vary from be fifty present to other presents depending on application.

FIG. 5B shows the irregular split or stagger line 68 from "Point C" to "Point D" at the mating edges of the left side 57 and right side 59 of the split keyboard with key six 64 on right side 59. The placement of key six is sometimes because of teachings that dictate placement, and some are for manufacturing or design preference. The unique stagger of split keyboard in the mating area between left keyboard 57 and right keyboard 59 is very advantageous to the interlocking and alignment and by making the lateral pitch in both horizontal and vertical directions match precisely can alleviate the need for aligning pins or the like. The key to key pitch is very important for maintaining ease of play or typing and dimensionally is less than half the pitch of the key measured from the centerline of the key to outer edge of the keyboard housing at the mating edges.

Figure 6:
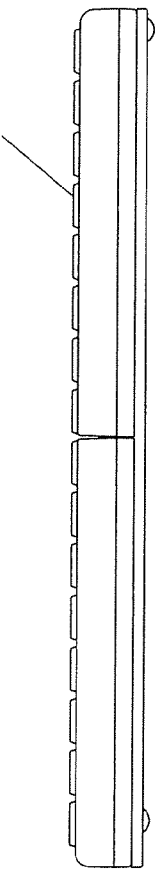
FIG. 6 is a front view of FIG. 5 showing the keys are planar when the left and right side of the keyboard are together in accordance with the teachings of this invention.

FIG. 6 shows and front view of keyboard 50 of FIG. 5 showing keys 66 are coplanar when keyboard 50 is in a closed position.

FIG. 7 shows middle keyboard section 70 with a smaller housing for a more compact traveling size, with sharp keys 72 appropriately placed in relation to note keys 74. Middle keyboard section 70 is advantageous for adding keys that are not in the standard qwerty pattern of PC keys for host control and music input to the PC or other musical devices.

FIG. 8 shows middle keyboard section 80 that is full width for better interlocking and alignment of the keyboard sides when installed between keyboard sides and for a smoother physical transition from the left and right keyboard side for those skilled in the art it should be appreciated that other recesses and features in the middle keyboard section 80 could be implemented for pencils or other items for user advantages. Cable with female connection 207 is shown with cable with male connection 205 to connect left hand side keyboard 200 and right hand side keyboard 204 for inner keyboard communications when middle section 202 is inserted between. Right interlock 82 having three internal sides to align with right keyboard side, and left interlock 84 having three external interlocking sides to align with left keyboard side.

FIG. 9 shows direction to insert middle keyboard section 92 when inserted and removed directional arrow 94 between left side keyboard 90 and right side keyboard 96. The insertion can be a simple means like inserting middle keyboard section 92 with an operators hand, or in a other applications using an automated insertion and removal mechanism. Middle keyboard section 92 can be completely separable from keyboard 91 as shown or attached as shown in an alternate means in FIG. 14. Right hand keyboard positioner 98 integral to right side keyboard 96 being stopped when opening right side keyboard 96 to an open position by right inner wall limiting stop 97 of lower housing 99, and left hand keyboard positioner 95 integral to left side keyboard 90 being stopped when opening left side keyboard 90 to an open position by left inner wall limiting stop 93 of lower housing 99 and is very important to spacing keyboard sides to an exact distance to allow middle keyboard 92 to be inserted and maintain a contiguous key to key pitch so an operators fingers will not feel a difference with using keyboard 91 to not feel a separation between keyboard middle and sides so to feel a contiguous key to key pitch or spacing. One has to appreciate an operator playing a piano and having the keys separating while playing, this appreciation is the reason for the maintained key to key pitch. It can also be advantageous to have slight pressure on the positioner from the limiting stop to maintain a tight key to key separation. When positioning left side keyboard 90 and right side keyboard 96 in a closed position from an open position left side ramp 76 and right side ramp 78 allow a smooth transition over lower housing 99.

For keyboard 91 to be a split keyboard and operate in an office and musical environment middle keyboard section 92 must be removable so left keyboard side 90 and right keyboard side 96 can close and operate with the same key to key pitch as a normal PC qwerty keyboard, although operating with the keyboard sides apart is advantageous for less stress on the operator the keyboard will be used closed.

Figure 10:
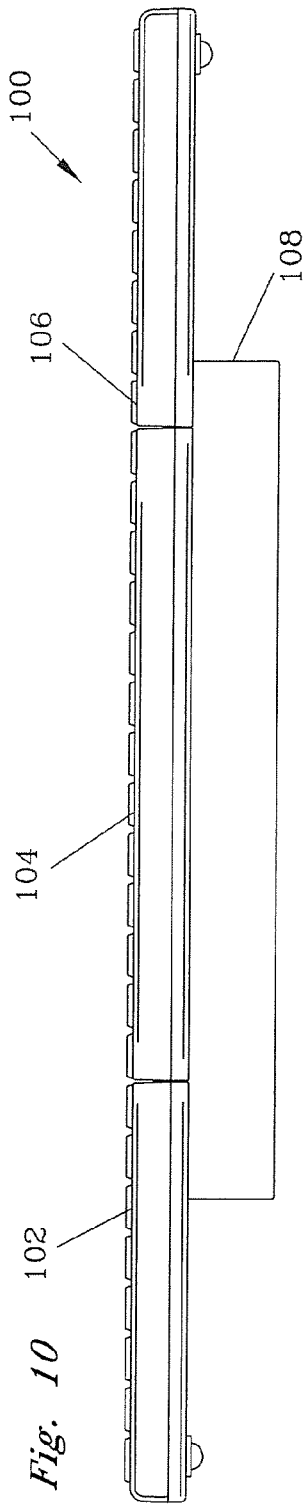
FIG. 10 is a front view of a split keyboard where the middle section of keys are stored within a keyboard and shows a middle section of keys in the operable position and the keys are planar in accordance with the teachings of this invention.

FIG. 10 is a front view of split keyboard 100 where the middle section of keys 104 are stored within keyboard 100 and shows a middle section of keys 104 in the operable position and the keys are coplanar to left side keyboard 102 and right side keyboard 106. Lower housing 108 can contain either a portable computer or just the keyboard housing.

Figure 11:
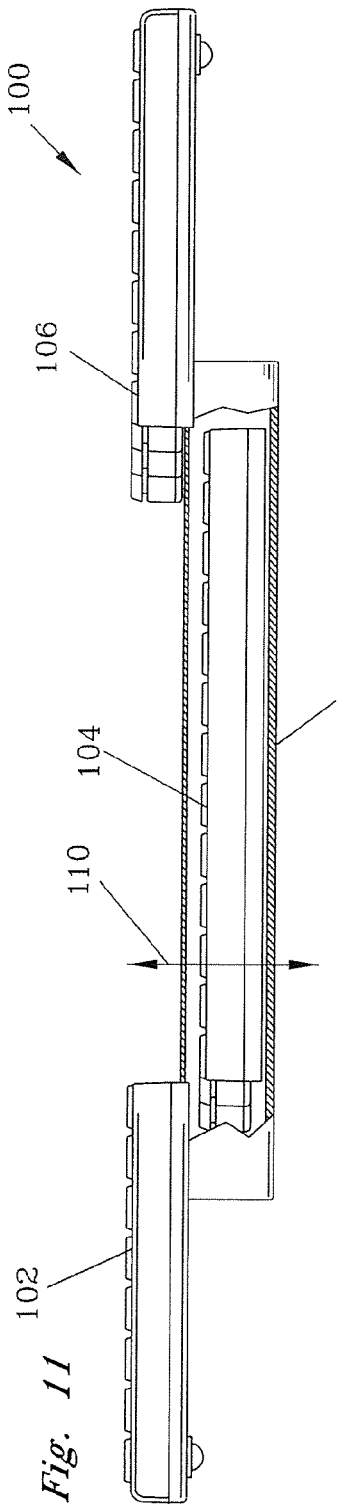
FIG. 11 shows a middle section of keys in the cut away section when a middle section of keys are stored within a keyboard in accordance with the teachings of this invention.

FIG. 11 shows middle section of keys 104 in a cutaway section when middle section of keys 104 are stored within keyboard 100. Directional arrow 110 shows the movement from an operable position to a stored position within a portable computer or keyboard housing 108.

Figure 12:
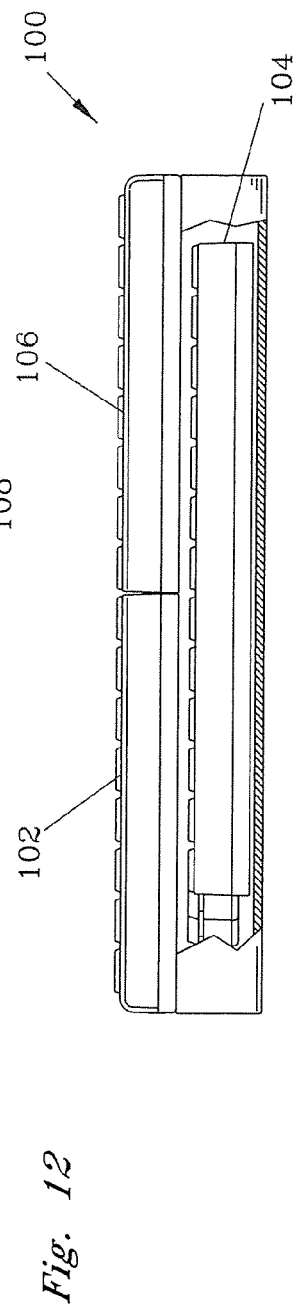
FIG. 12 is a view of a split keyboard with a middle section of keys shown in the cut away view are stored and the left and right side keyboards are closed in accordance with the teachings of this invention.

FIG. 12 shows split keyboard 100 with middle section of keys 104 shown in the cutaway view are stored and left side keyboard 102 and right side keyboard 106 are closed.

Figure 13:
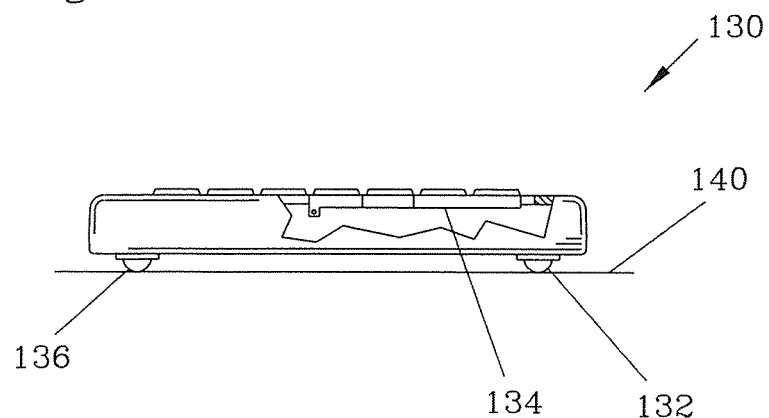
FIG. 13 shows an end view of a split keyboard with a middle section of keys that rotates into between a left and right side section of keys in an operable position in accordance with the teachings of this invention.

FIG. 13 shows an end view of split keyboard 130 with middle section of keys 134 in a cutaway view that has rotated to between left side keyboard and right side keyboard making up split keyboard 130 into an operable position. With front foot 132 and rear foot 136 positioning split keyboard 130 in an operating position parallel to desk surface 140.

Figure 14:
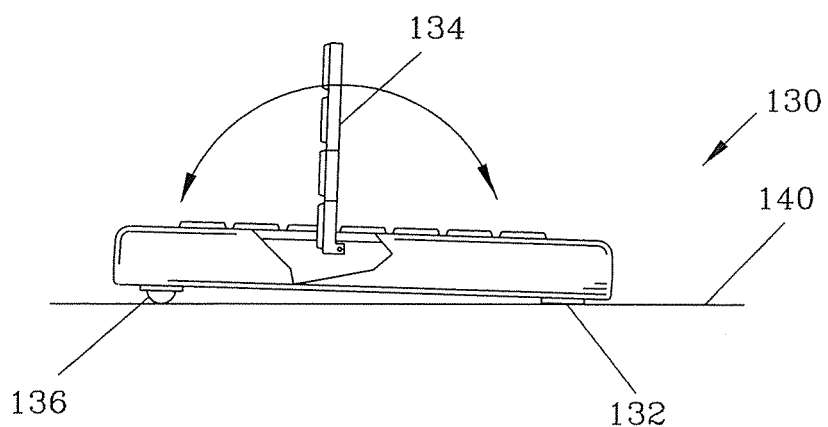
FIG. 14 shows a view of FIG. 13 with the rotating middle section of keys in a partial rotation between an operable position and a stored position with feet positioning the keyboard angle in a positive angle to a user in accordance with the teachings of this invention.
Figure 15:
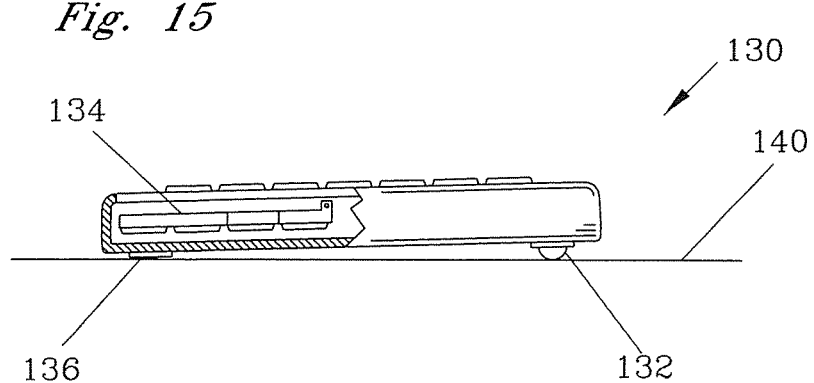
FIG. 15 shows a view of FIG. 13 with the rotating middle section of keys in the stored position with feet positioning the keyboard angle in a negative angle to a user in accordance with the teachings of this invention.

FIG. 14 shows a view of FIG. 13 with rotating middle section of keys 134 in a partial rotation between an operable position of FIG. 13 and a stored position of FIG. 15. With front foot 132 and rear foot 136 positioning split keyboard 130 in an operating position at a positive angle to desk surface 140.

FIG. 15 shows a view of FIG. 13 with rotating middle section of keys 134 in the stored position shown in cutaway within split keyboard 130. With front foot 132 and rear foot 136 positioning split keyboard 130 in an operating position at a negative angle to a desk surface 140. Positive and negative angles of slope are being studied to reduce stress in wrists et al joints and these foot positions are being offered to make an operator more comfortable. Those skilled in the art can appreciate they are many feet adjusting mechanisms to raise and lower feet to adjust the angle of operation and this means is just one but is being shown for positive and negative slope selection.

Tooling cost are a large part of any new production product and can often be a go for the project or a no go for a project so any proposals to reduce the tooling cost are very advantageous to companies starting new products. This invention is advantageous because the split keyboard depending on the switch technology used, meaning thin switch or thick switch, contact switch, contactless switch, or optical switch can be made thin enough for thin standalone keyboards or to fit within existing portable computers to replace the existing keyboard, and cost effective enough for toy keyboards.

Figure 16:
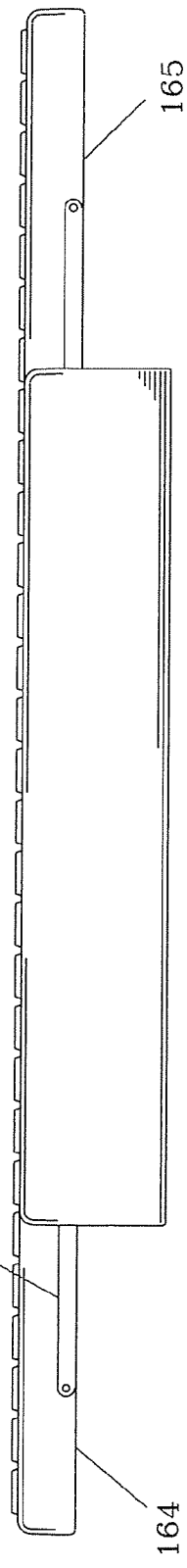
FIG. 16 shows a front view of a split keyboard for a portable computer that rotates from an closed position to an open position and when closed is within the portable computer in accordance with the teachings of this invention.
Figure 17:
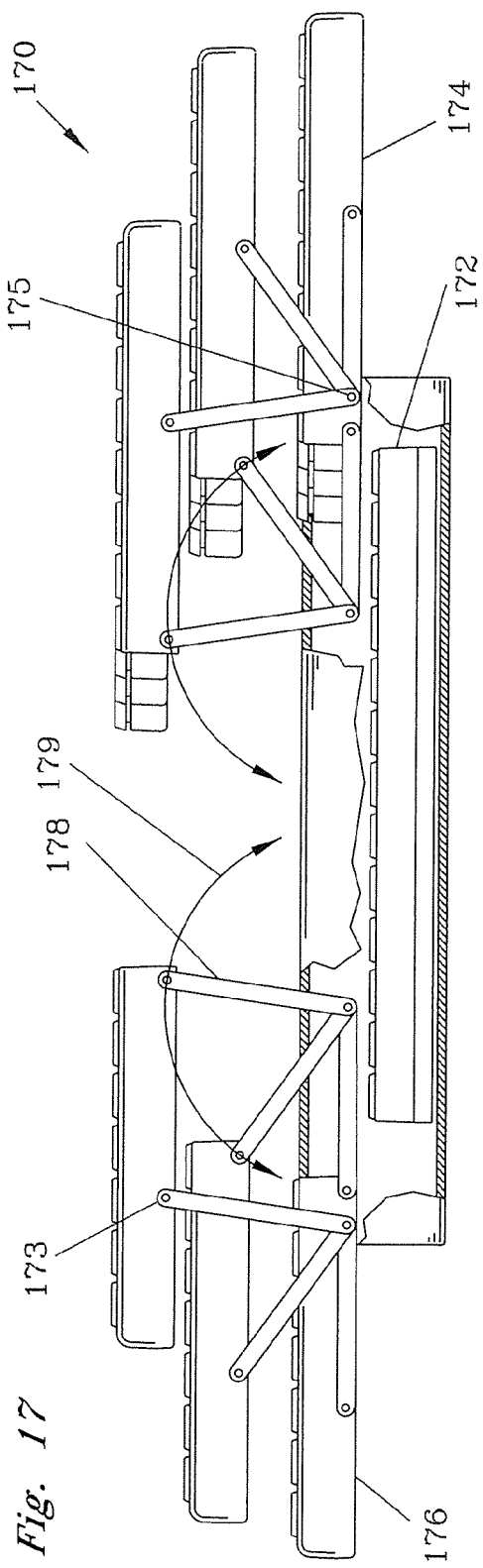
FIG. 17 shows a another front view of FIG. 16 with the split keyboards in different points through the rotating process with the middle section of keys shown in cutaway in the stored position in accordance with the teachings of this invention.

FIG. 16 shows a front view of split keyboard 160 for a portable computer that rotates from a closed position to an open or operable position, rotating better shown in FIG. 17, and when closed is within the portable computer overall frame size. No other split keyboard has the opening and closing adaptable to fitting within a portable computer without major design changes to the portable computer and no major new tooling charges. Being within the portable computer means no new tooling cost for the portable computer housing or internal computer parts. With this configuration of split keyboard to be placed where the old keyboard was means that all is needed is to reduce the key pitch in both the X and Z axis so rotating links 162 have enough room to operate when opening and closing. This is very advantageous because all that is needed is to make a kit of parts with split left side keyboard 164 and split right side keyboard 166, then remove the old keyboard that came with the portable computer and assembly in the split keyboard kit. Then use the middle section of keyboard 92 of FIG. 9 and have at least a four octave musical keyboard and still remain all of the functionality of the portable keyboard when the split keyboard is in the closed position so normal PC keyboarding can be done.

FIG. 17 shows split keyboard 170 which has middle section of keys 172 stored within. Rotating positioners 178 and directional arrows 179 shows the rotating positions of left side keyboard 176 and right side keyboard 174 through the opening and closing rotation. Adjustable keyboard side tension positioner retainers 173 and adjustable housing side tension positioner retainer 174 can be adjusted to limit the free movement of left side keyboard 176 and right side keyboard 174 so the keyboard can be operated any where through the rotation for open to closed positions. Positioner 178 is advantageous to space left side keyboard 176 and right side keyboard 174 when in the open position so that the contiguous key to key pitch is maintained when middle section of keys 172 are inserted between left and right keyboard sides, and act as a stop because of the opening radius.

Figure 18:
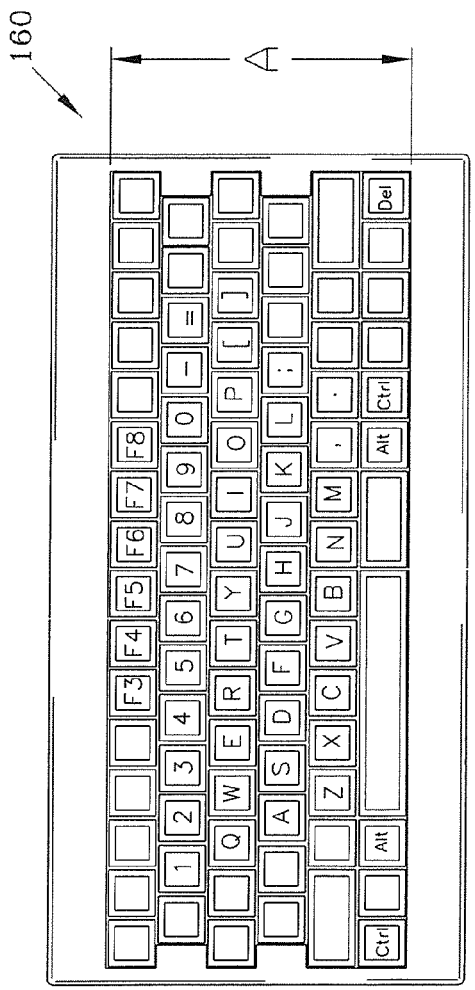
FIG. 18 shows a plan view of a normal notebook type of keyboard in accordance with the teachings of this invention.
Figure 19:
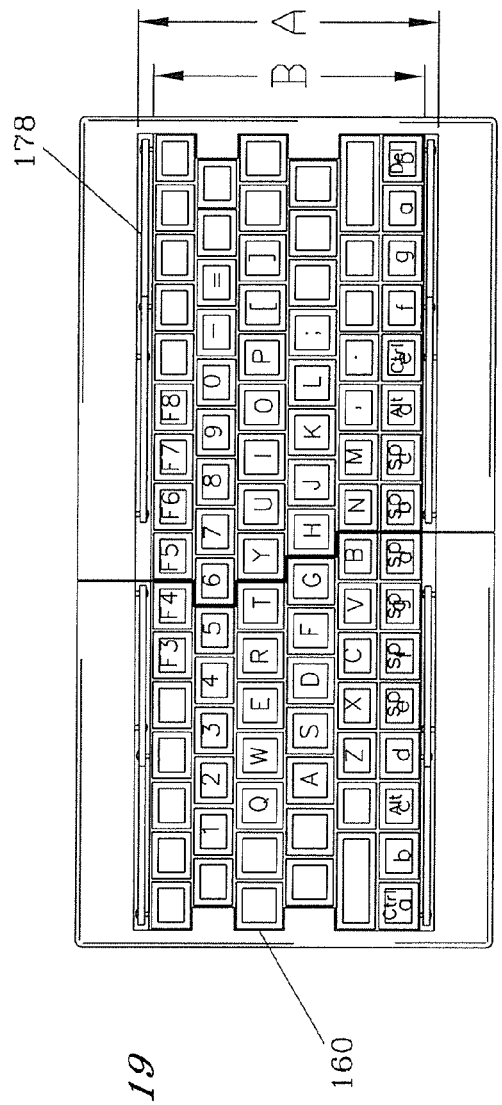
FIG. 19 shows a plan view of a split keyboard with the same overall size as the keyboard in FIG. 18 but with the keys being reduced in size to allow rotating links of FIG. 17 within the same size notebook computer in accordance with the teachings of this invention.

FIG. 18 shows a plan view of a normal notebook type of keyboard 180 with a dimension A showing the size of the normal size of the keyboard. FIG. 19 shows the same dimension A at the same size with a dimension B showing the slight reduction in keyboard 192 to allow for rotating links 178 of FIG. 17 to operate from an open and closed position.

FIG. 20 shows left keyboard side 200 with double wide keyboard key 208 longer in the Y direction and is separated from right keyboard side 164 separated by middle keyboard section 202 with double wide key 206. Having double wide key 206 is advantageous to give the keyboard the feel of a piano that has long keys and enabling play to be more natural and also ten finger cords. In this configuration middle keyboard section 202 could be used in a more dedicated musical keyboard. FIG. 21 with wide keyboard key 210 as also show in FIG. 21 could span more than two keys vertically or the Y direction and could be turned horizontal to also span more than two keys in the X direction in different applications where a wider key would be advantageous and those skilled in the art could appreciate where a wider key can be advantageous to increase the functionality of the keyboard.

Figure 22:
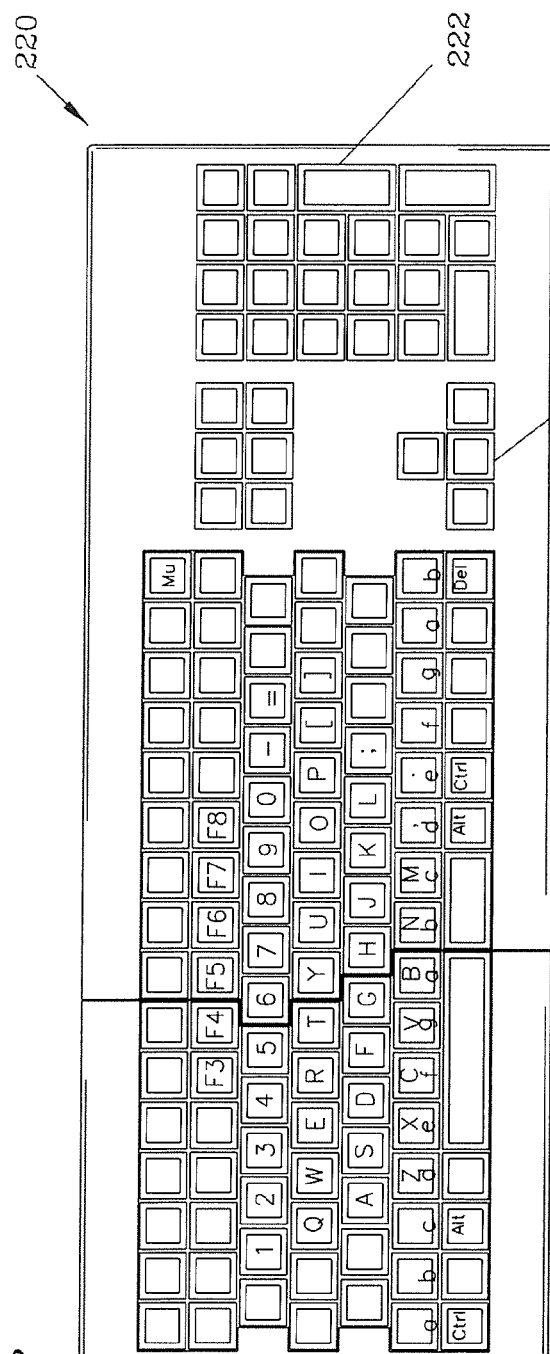
FIG. 22 shows a plan view of a split keyboard with number pad and directional keys in accordance with the teachings of this invention.

FIG. 22 shows split keyboard 220 with number pad 222 and directional keys 224 to increase the usability and offer more function to office environments.

Figure 23:
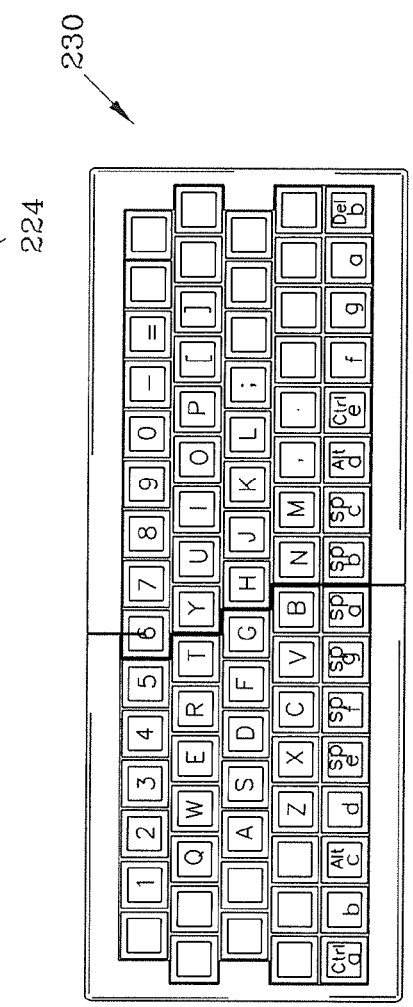
FIG. 23 shows a plan view of a reduce size split keyboard with minimal keys in accordance with the teachings of this invention.

FIG. 23 shows a reduce size split keyboard 230 with less rows and keys. By reducing the number of keys needed to fit a particular application in the keyboard the keyboard could only have five or six rows, or even less and those skilled in the art can appreciate that the pitch of keys in either the vertical or horizontal direction could also be reduced for maybe users with small hands like children making the keyboard even smaller, lighter and more compact.

Figure 24:
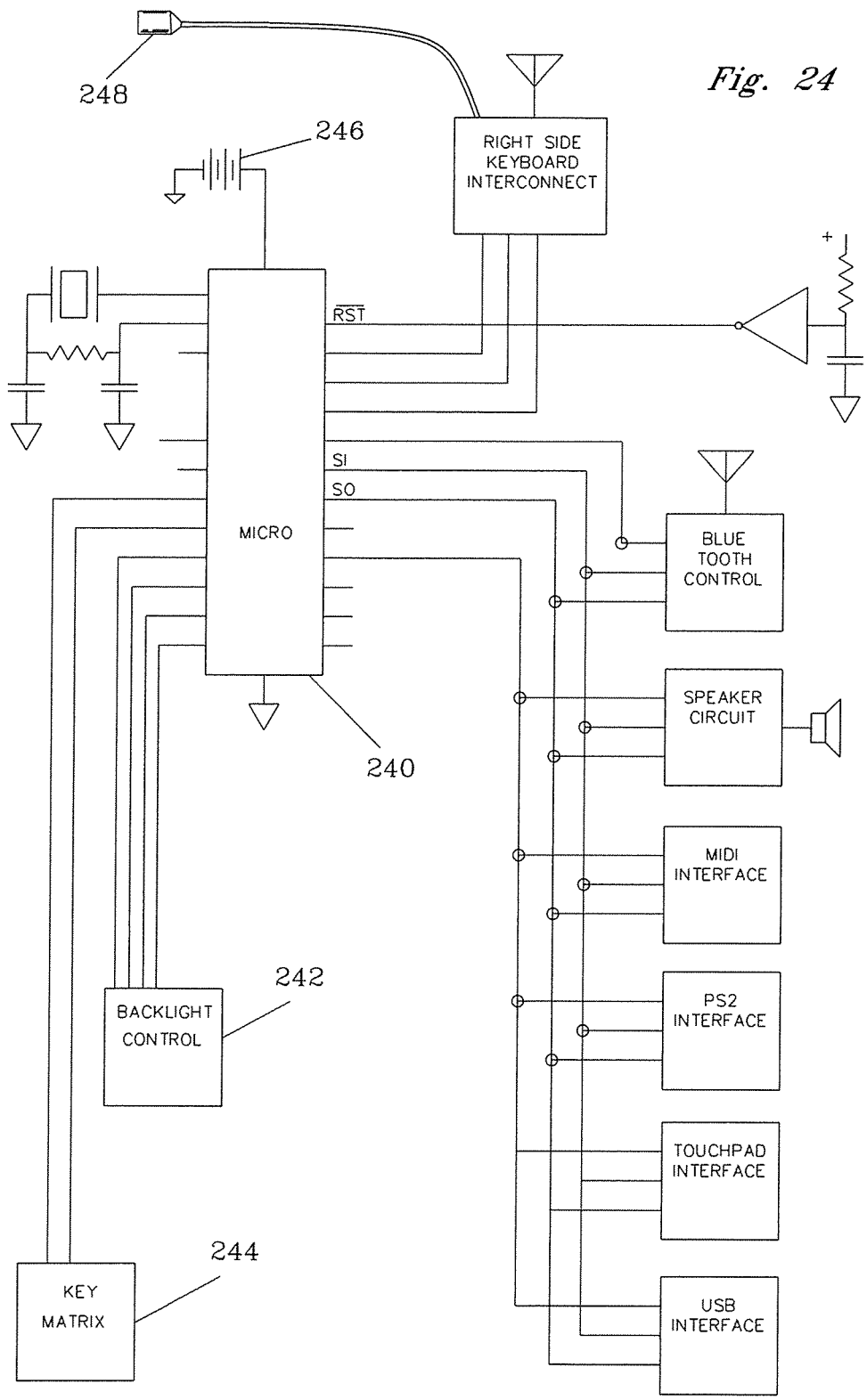
FIG. 24 shows an electronic circuit that operates the split keyboard right section of keys in accordance with the teachings of this invention.

FIG. 24 is a schematic of the right side of the split keyboard showing the controlling microprocessor 240 with backlight control 242 controlling the brightness of the spilt keyboard and functions like caps lock, scroll lock, and number lock keys to be shown on or off, key matrix control 244 scans key positions to detect which key is pressed, and other shown named circuit functions for outputting data to a host and controlling the split keyboard. Right side battery 246 can be used for powering the keyboard when no physical connection is used to the host and the keyboard is communication wirelessly. Right side interconnection 248 is used to connect with the middle and left keyboard. The wireless connection can be between keyboard sections and or with the host computer, when right side interconnection 248 is not be used.

Figure 25:
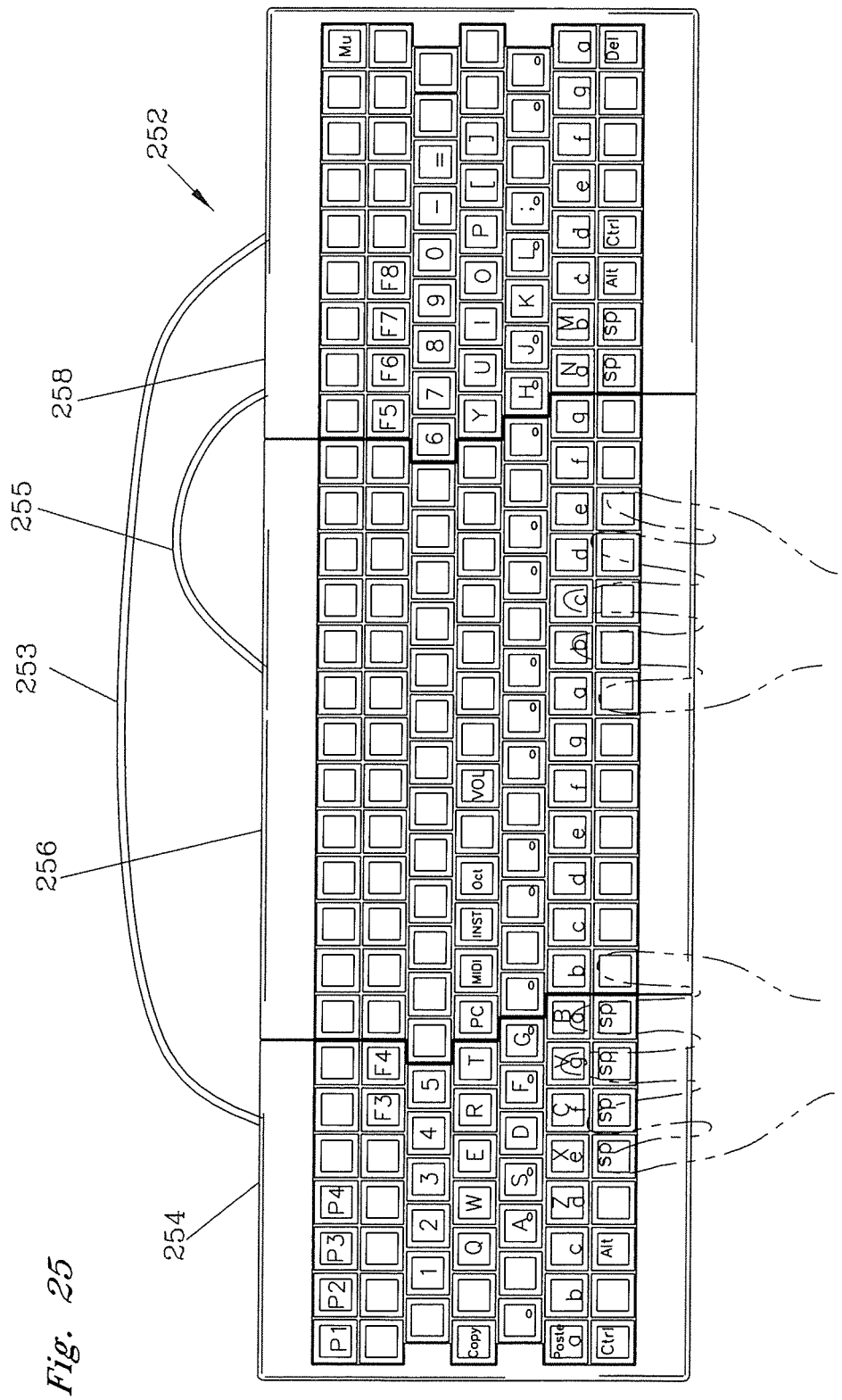
FIG. 25 shows a plan view of the split keyboard with a middle section of keys with a full compliment of keys in accordance with the teachings of this invention.

FIG. 25 shows left side keyboard 254 of split keyboard 252 with right side keyboard 258 with middle section of keys 256 there between with keys contiguous in all rows which could be used in applications requiring more keys and advantageous for a musical organ application. Interconnection cable 253 caries signal from left keyboard side 254 to right keyboard side 258, the actual connection can be either be pluggable or hard wired, Middle interconnection cable 255 connects right side keyboard 258 to middle section of keys 256 and can either be pluggable or hard wired. Those skilled in the can appreciate depending on a designers choice of which keyboard section is controlling keyboard 252 the wiring can be connected differently.

FIG. 26 shows split keyboard 262 with left side keys 264 and right side keys 266 being separated by housing 268 containing display with touch screen 260 which is advantageous for word processing and other applications need data input.

FIG. 27 shows split keyboard 276 with free standing left side keyboard 270 and free standing right side keyboard 274 with no alignment housing there between. Center section of keys 272 is aligned with left side keyboard 270 using left side alignment snap pins 278 and with right side keyboard 274 using right side alignment snap pins 279. Using snap pins 278 and 279 to align center section of keys 272 holds left side keyboard 270 and right side keyboard 274 in position to have a contiguous key to key pitch for ease of transitioning between playing a piano and split keyboard 276 to maintain key position for playing music or applications needing a keyboard with more keys. It should be appreciated by those skilled in the art that the design of the snap feature to hold the keyboards aligned and together could be any number of retainers or other features for the same purpose. The unique stagger of keyboard 276 in the mating area between left keyboard 270 and right keyboard 274 is very advantageous to the alignment and by making the lateral pitch in both horizontal and vertical directions match precisely can alleviate the need for aligning pins 278 and 279 or the like.

FIG. 28 shows a front view of FIG. 27 with free standing left keyboard side 280 and right side free standing keyboard 284 with the center section 282 there between all in the same plane being aligned by left snap alignment pin 286 when the keyboard sides are snapped together.

Figure 29:
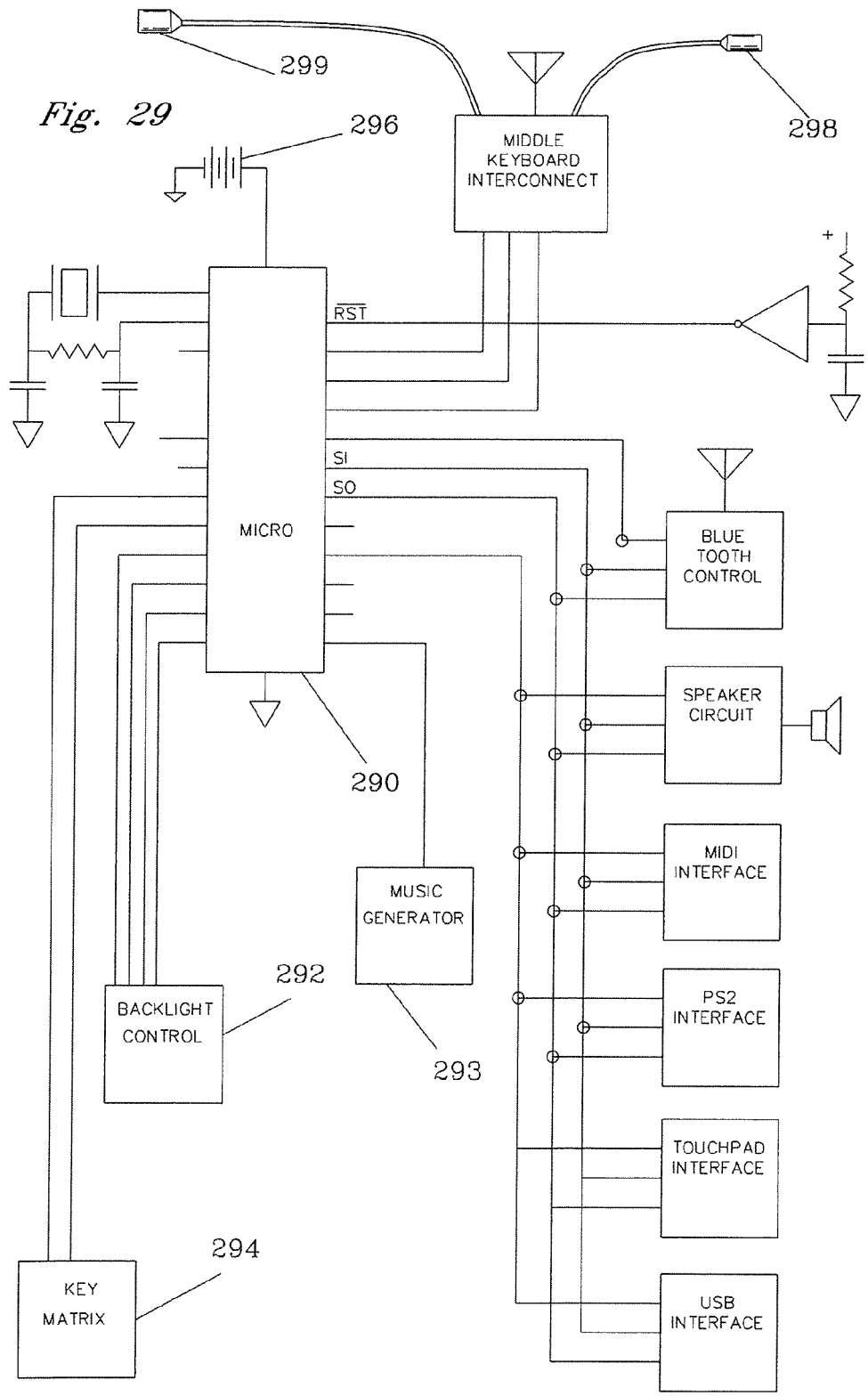
FIG. 29 shows an electronic circuit that operates the split keyboard middle section of keys in accordance with the teachings of this invention.

FIG. 29 is a schematic of the middle section of the split keyboard showing the controlling microprocessor 290 with backlight control 292 controlling the brightness of the spilt keyboard and functions, key matrix control 294 scans key positions to detect which key is pressed, and other shown named circuit functions for outputting data to a host and controlling the split keyboard. Middle section battery 296 can be used for powering the keyboard when no physical connection is used to the host and the keyboard is communication wirelessly. Middle section interconnection 298 and 299 are used to connect with the right and left keyboards respectively. The wireless connection can be between keyboard sections and or with the host computer, when middle section interconnections 298 and 299 are not used.

Figure 30:
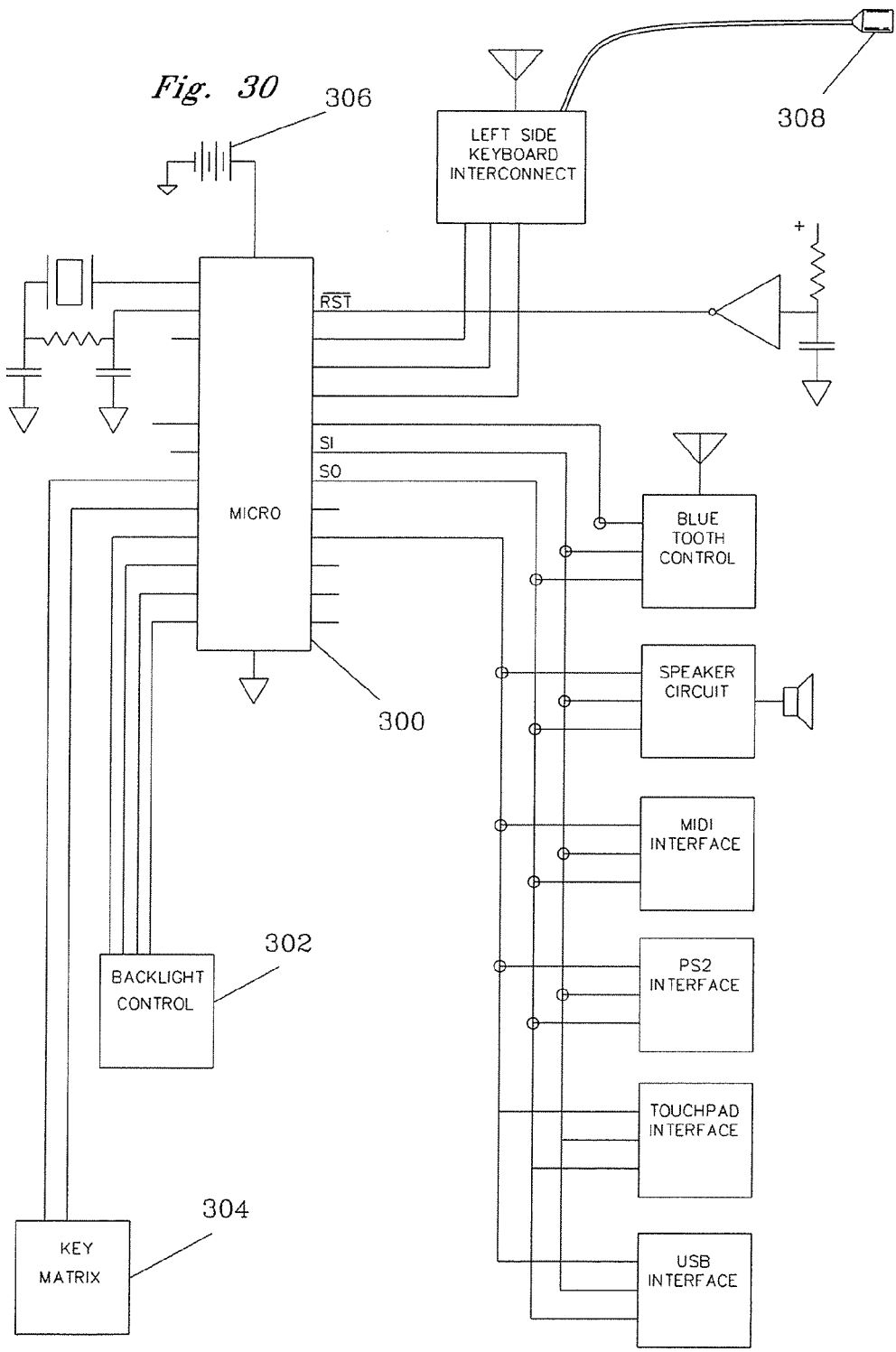
FIG. 30 shows an electronic circuit that operates the split keyboard left section of keys in accordance with the teachings of this invention.

FIG. 30 is a schematic of the left side of the split keyboard showing the controlling microprocessor 300 with backlight control 302 controlling the brightness of the spilt keyboard and functions like caps lock, scroll lock, and number lock keys to be shown on or off, key matrix control 304 to scan key position to detect which key is pressed, and other shown named circuit functions for outputting data to a host and controlling the split keyboard. Left side battery 306 can be used for powering the keyboard when no physical connection is used to the host and the keyboard is communication wirelessly. Right side interconnection 308 is used to connect with the middle and right keyboard. The wireless connection can be between keyboard sections and or with the host computer when left side interconnection 308 is not be used.

Figure 31:
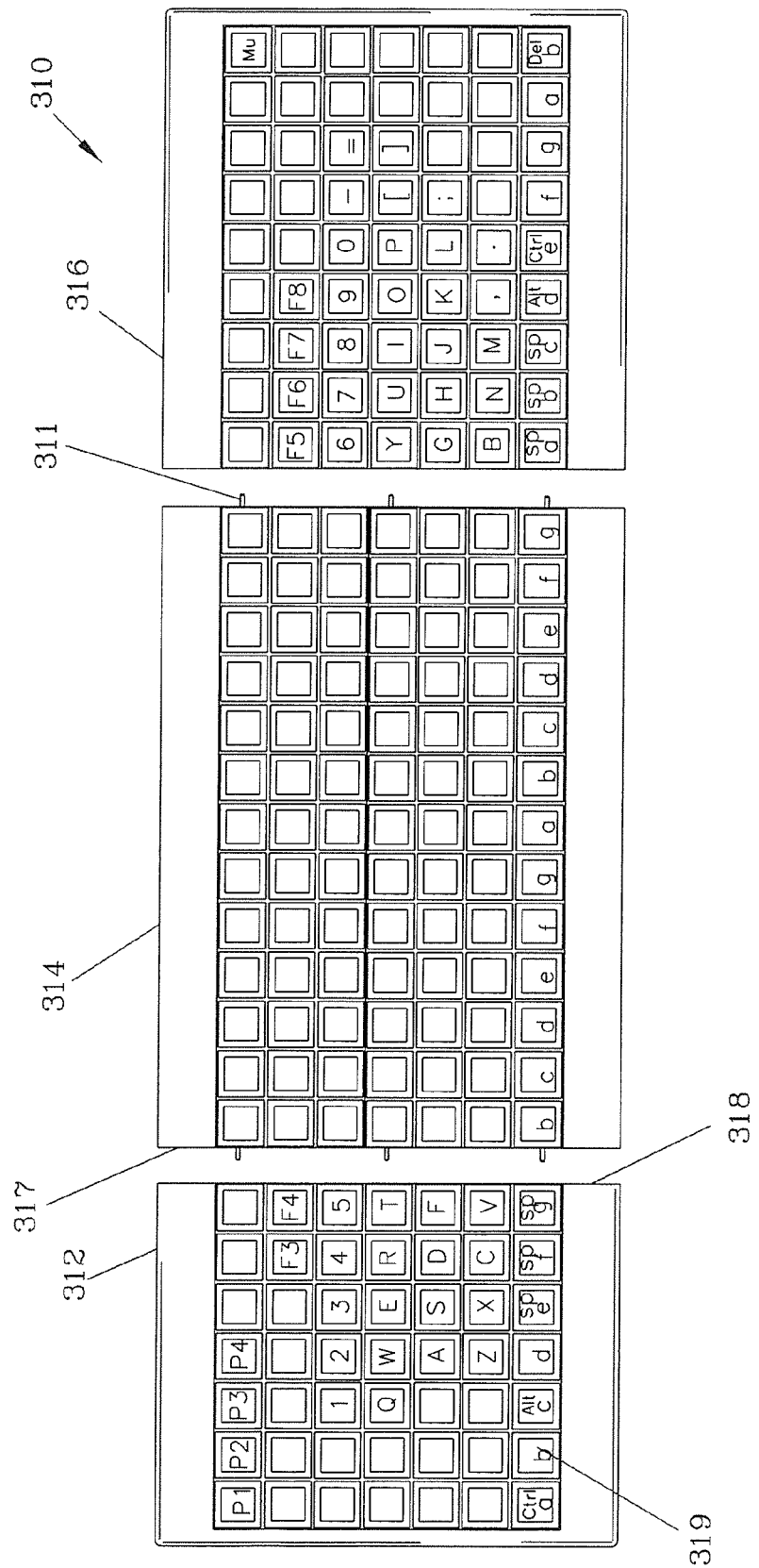
FIG. 31 shows a plan view of the split keyboard with rectangular pitch key pattern with free standing keyboard sides with a middle section of keys with alignment pins between the keyboard sides in accordance with the teachings of this invention.

FIG. 31 shows split keyboard 310 and rectangular pitch key pattern 319 with free standing left keyboard side 312, middle keyboard section 314 and right keyboard section 316. Alignment pins 311 align the keyboard sides with the keyboard middle section. Right mating edge 318 of left keyboard side 312 mates with left mating edge 317 of middle section 314 and both are thin enough so as to allow the key to key pitch to be contiguous across the mating of the two keyboard sections, and dimensionally less than half the pitch of the key measured from the centerline of the key to outer edge of the housing at the mating edge. The rectangular key pattern 319 is a pattern where there is substantially no lateral stagger in the keys both in the horizontal and vertical direction and makes one of the advantages for this stile of keyboard for users that want a portable keyboard with a large number of keys to fit inside of carry on luggage or the like. Middle section of keys 314 being not limited to number, shape or size of keys can be used for a piano type keyboard in a very small transportable size. Those skilled in the art should appreciate that alignment pins 311 could be of other designs to accomplish the same function.

Those skilled in the art should appreciate the four octaves that this invention is showing could be more octaves and the more octaves means more keys and there can be a need whether more or less keys to have wider keys depending on the inventions application and not deter the advantageous spilt keyboard with a removable middle section of keys. And with the keyboard running under microprocessor control and different applications, remapping the keys to different resultant outputs and changing the key indicia to objects or other symbols rather than standard QWERTY text can match other applications. Also making a dedicated split keyboard for children should also be appreciated with a small key to key pitch and the minimal set of keys would still be appreciated.

While the invention has been described in terms of a single preferred embodiment, those skilled in the art will recognize that the invention can be practiced with modification within the spirit and scope of the appended claims.

The invention claimed is:

1. A keyboard for outputting data and music, comprising in combination:
   a plurality of keys forming a keyboard in a keyboard housing;
   said keys having a key pitch;
   said keys having a key pattern which includes a QWERTY staggered key pattern wherein at least one row of keys is offset in an X direction from one or more other rows of keys;
   said keyboard housing having a left mating edge with an alignment means to accept a left keyboard side and when accepted have contiguous key to key pitch over said left mating edge to said left keyboard;
   said keyboard housing having a right mating edge with said alignment means to accept a right keyboard side and when accepted have contiguous key to key pitch over said right mating edge to said right keyboard;
   said left mating edge is less than half said key pitch to said key nearest said left mating edge;
   said right mating edge is less than half said key pitch to said key nearest said right mating edge; and
   a microprocessor to scan said keys and assign a key code to key or keys being touched.

2. A keyboard for outputting data and music as claimed in claim 1, further including
   a left side keyboard with a plurality of left side keys with a right side keyboard mating edge detachably received to said keyboard;
   said left side keyboard having an alignment means to said keyboard;
   said right side keyboard mating edge is less than half said left side key pitch to said right side key nearest said right keyboard mating edge;
   a left side keyboard connector to be detachable received to said keyboard; and
   a left side microprocessor to scan said keys to detect which key or keys are being touched.

3. A keyboard for outputting data and music as claimed in claim 1, further including
   a right side keyboard with a plurality of right side keys with a left side keyboard mating edge detachably received to said keyboard;
   said right side keyboard having an alignment means to said keyboard;
   said left side keyboard mating edge is less than half said left side key pitch to said left side key nearest said left keyboard mating edge;
   a right side keyboard connector to be detachable received to said keyboard; and
   a right side microprocessor to scan said keys to detect which key or keys are being touched.

4. A keyboard for outputting data and music as claimed in claim 1,
   wherein said alignment means is a base.

5. A keyboard for outputting data and music as claimed in claim 1, further including
   means for receiving said key codes and generating music indicative of said key codes.

6. A keyboard for outputting data and music as claimed in claim 1, further including
   said microprocessor output PC and music data to a host.

7. A keyboard for outputting data and music as claimed in claim 2, whereas
   key outputs from said left side keyboard are communicated to said keyboard to output music.

8. A keyboard for outputting data and music as claimed in claim 3, whereas
   key outputs from said right side keyboard are communicated to said keyboard to output music.

9. A keyboard for outputting data and music as claimed in claim 1, whereas
   said keyboard has at least one row of keys;
   all keys in said at least one row of keys has a first row with the same said key to key lateral pitch.

10. A keyboard for outputting data and music as claimed in claim 9, whereas
    all keys in said at least one row of keys has a second row with the same said key to key lateral pitch.

* * * * *